United States Patent
Harnetiaux et al.

(10) Patent No.: US 8,167,583 B2
(45) Date of Patent: May 1, 2012

(54) PUMP SUPPORT COUPLER SYSTEM

(75) Inventors: Travis L. Harnetiaux, Woodridge, IL (US); Leonard A. Bettin, Lagrange Park, IL (US)

(73) Assignee: CNH America LLC, New Holland, PA (US)

( * ) Notice: Subject to any disclaimer, the term of this patent is extended or adjusted under 35 U.S.C. 154(b) by 859 days.

(21) Appl. No.: 12/258,057

(22) Filed: Oct. 24, 2008

(65) Prior Publication Data

US 2010/0101810 A1    Apr. 29, 2010

(51) Int. Cl.
F04B 17/00  (2006.01)
F04B 35/00  (2006.01)

(52) U.S. Cl. ...... 417/360; 417/361; 180/53.1; 180/53.4; 180/53.8; 464/177

(58) Field of Classification Search .......... 417/360–361; 180/53.1–53.8; 464/177; 248/230.8, 49, 248/53, 74.3; 285/24; 24/455, 464, 69 TM, 24/69 WT
See application file for complete search history.

(56) References Cited

U.S. PATENT DOCUMENTS

| | | | |
|---|---|---|---|
| 2,469,181 A | 5/1949 | Slater | |
| 2,851,896 A | 9/1958 | Ordway | |
| 3,435,778 A | 4/1969 | Ascuitto et al. | |
| 3,587,331 A | 6/1971 | Moss | |
| 3,643,642 A | 2/1972 | Junes | |
| 4,172,367 A | 10/1979 | McCusker | |
| 4,300,872 A | 11/1981 | Brown et al. | |
| 4,307,583 A | 12/1981 | Hall | |
| 4,733,738 A | 3/1988 | Rowe | |
| 4,741,676 A | 5/1988 | Janes | |
| 5,645,363 A | 7/1997 | Dafforn et al. | |
| 5,765,650 A | 6/1998 | Checkel | |
| 5,895,203 A * | 4/1999 | Klein | 415/122.1 |
| 6,224,289 B1 | 5/2001 | Redd et al. | |
| 6,499,548 B2 | 12/2002 | Wesley | |
| 7,241,117 B2 * | 7/2007 | Baer et al. | 417/360 |
| 7,572,112 B2 * | 8/2009 | Markle | 417/360 |
| 7,614,855 B2 * | 11/2009 | Cook | 417/363 |
| 8,021,132 B2 * | 9/2011 | Green | 417/423.6 |
| 2005/0126319 A1 * | 6/2005 | Jones | 74/11 |
| 2007/0022925 A1 * | 2/2007 | Bettin et al. | 111/34 |

FOREIGN PATENT DOCUMENTS

FR    2565533    12/1985

* cited by examiner

*Primary Examiner* — Peter Macchiarolo
*Assistant Examiner* — Jose M Diaz
(74) *Attorney, Agent, or Firm* — Rebecca Henkel

(57) ABSTRACT

A pump support coupler assembly for connecting a large displacement hydraulic pump to a tractor power take off device is provided. The pump support coupler assembly includes a coupler housing with front and back walls, and sidewalls. The high displacement hydraulic pump attaches directly or indirectly to the coupler housing back wall. A shaft extends longitudinally through the coupler housing. The shaft is coupled to an input shaft of the hydraulic pump at its first end and a power take off output shaft at its second end. A torque restraint strap extends between the coupler housing and a tractor drawbar, and prevents the coupler housing from rotating about its longitudinal axis. In this configuration, the power take off output shaft supports the pump support coupler assembly and the hydraulic pump, and since the pump is attached to the coupler housing, the pump input shaft is not subjected to bending-type loads.

20 Claims, 3 Drawing Sheets

PUMP SUPPORT COUPLER SYSTEM

FIELD OF THE INVENTION

The invention relates generally to mounting devices for hydraulic pumps and, more specifically, to a pump support coupler system for use with agricultural tractors that utilize large or high displacement hydraulic pumps that are driven by a tractor power take off (PTO) shaft. The pump support coupler system includes a shaft that is provided in a coupler housing. A housing of the high displacement hydraulic pump connects to the coupler housing. The weight of the connected coupler housing and hydraulic pump is supported by a coupling interface between the PTO shaft and the shaft housed in the coupler housing. This configuration mounts the high displacement hydraulic pump to the tractor without complex brackets and allows the system to function without inflicting any bending-type loads on the pump input shaft.

BACKGROUND OF THE INVENTION

Tractor power take off (PTO) driven hydraulic pumps are used in numerous agricultural applications. Auxiliary hydraulic pumps, such as PTO driven implementations, can provide hydraulic power to various components of agricultural implements.

Some PTO driven hydraulic pumps are relatively small, lightweight, and have low displacement configurations. Some low displacement hydraulic pumps have pump input shafts that are slid onto or over a PTO shaft, whereby the PTO shaft supports the pump. Such PTO shaft supported hydraulic pumps are small, lightweight, and low displacement hydraulic pumps. Since PTO shaft supported hydraulic pumps are supported by the coupling interaction of the PTO shaft and the pump input shaft, these pump input shafts are subjected to bending-type loads that are functions of the pump weight as well as how far the pump extends longitudinally beyond the end of the PTO shaft. Bending loads can lead to premature input shaft or input shaft bearing failure, or failure of other internal components of the pump.

Bending load induced input shaft and/or other component failure can be even more of a use-life issue in large displacement hydraulic pumps, since these pumps tend to be larger and heavier than low displacement versions. For this reason, high displacement hydraulic pumps are not PTO shaft supported but rather are, e.g., mounted to or supported by the tractor itself. Complex brackets are used to mount large displacement hydraulic pumps to a PTO output housing or other part of a rear axle housing of the tractor. Installing the complex brackets to a tractor's rear axle housing can be labor intensive. Connecting a high displacement hydraulic pump to, or removing it from, such complex bracket can, itself, be labor intensive. Furthermore, the complex brackets are application specific, i.e., tractor specific. Accordingly, if users have multiple tractors that will occasionally utilize and power a high displacement hydraulic pump, a complex bracket must be installed on each of the tractor multiple tractors, noting that the complex brackets can be relatively expensive pieces of hardware.

SUMMARY OF THE INVENTION

There is a need to provide a high displacement hydraulic pump that can be quickly mounted to a tractor, for example by slip fitting onto a PTO shaft, without subjecting a corresponding pump input shaft to bending-type loads.

The present invention provides pump support coupler assembly that can be connected to a high displacement hydraulic pump that allows the pump support coupler assembly and the high displacement hydraulic pump, in combination, to be quickly slip fitted onto a PTO shaft so that the PTO shaft carries the entire weight of such combination, without subjecting the pump input shaft to bending-type loads.

It is contemplated that the pump support coupler assembly may include a coupler housing with front and back walls and sidewalls. The high displacement hydraulic pump, which can weigh between about 40 and about 70 pounds, optionally more than about 70 pounds, attaches directly or indirectly to the coupler housing back wall. A shaft can extend longitudinally through the coupler housing. The shaft may be coupled to an input shaft of the hydraulic pump at its first end and a power take off output shaft at its second end. Preferably, a torque restraint strap extends between the coupler housing and a tractor drawbar or other part of the tractor, preventing the coupler housing from rotating about its longitudinal axis. In this configuration, the power take off output shaft supports the pump support coupler assembly and the hydraulic pump, and since the pump is attached to the coupler housing, the pump input shaft is not subjected to bending-type loads. In other words, the pump input shaft is not required to bear the load of the hydraulic pump because the connection between the pump housing and coupler housing bears the load or weight of the hydraulic pump.

In some implementations, a housing flange extends from an outer surface of the coupler housing. The housing flange can provide a mounting structure to which the torque restraint strap attaches. The torque restraint strap can be flexible, e.g., a length of chain or flexible but durable strap, or it can be made from a rigid material(s).

In still further implementations, the front wall of the coupler housing is removable from the remainder of the coupler housing. The front and rear walls of the coupler housing can have throughbores that are axially aligned with each other, permitting the shaft that is housed in the coupler housing to extend at least partially through each of the front and rear walls. Counter bores can extend into such throughbores of the front and rear walls, permitting outer bearing braces to mount snugly thereinto. The bearings can be, e.g., tapered roller bearings or other suitable bearings for supporting the shaft within the coupler housing.

In yet further implementations, the high displacement hydraulic pump does not bolt or attach directly to the coupler housing, but rather bolts or attaches to an intervening adapter plate. The adapter plate converts the pump mounting bolt pattern to a bolt pattern provided on the coupler housing.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
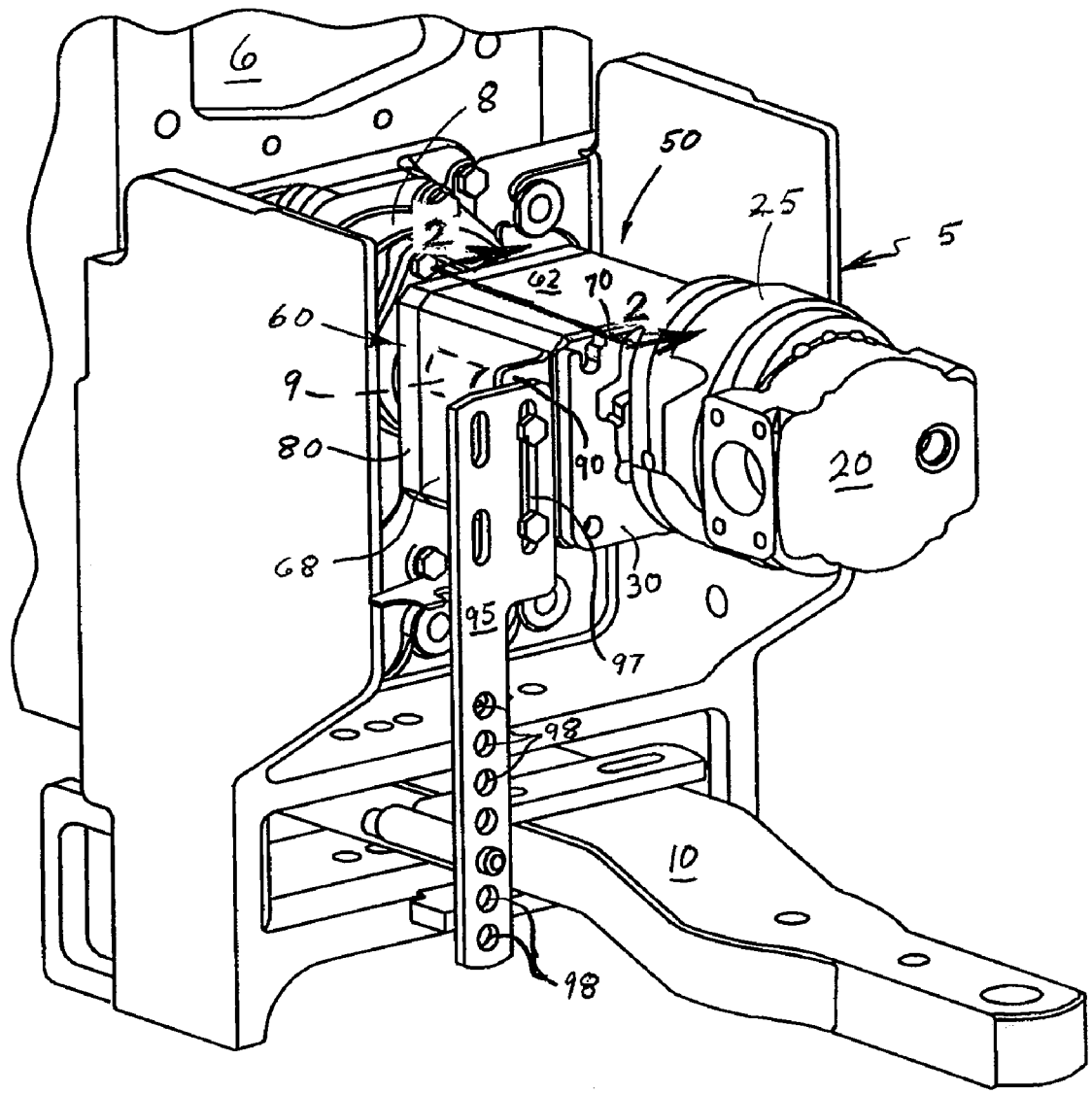
FIG. 1 illustrates a pictorial view of a first embodiment of a pump support coupler system in accordance with the present invention, incorporated onto an agricultural tractor.

FIG. 1 shows a first embodiment of a pump support coupler system; namely, system 5, employed on an agricultural tractor. Although typically discussed in terms of agricultural tractors, it is understood that system 5 can be suitably implemented on, e.g., industrial or other tractors, whereby reference tractors or agricultural tractors include such other implementations and are thus also within the scope of this invention.

Although no specific agricultural tractor is illustrated, it is well understood that system 5 can be incorporated into any of a variety of tractors that utilize implements that, e.g., require relatively high volumes of hydraulic fluid flow. Numerous suitable tractors include various ones manufactured by CNH America LLC, such as the Case IH MX Magnum series and STX Seiger series tractors, and others.

Regardless of the particular make and model of the tractor, it includes a rear axle housing 6 through which a PTO housing 8 emerges. The PTO housing concentrically supports a PTO output shaft 9 (seen in FIG. 2) that is used for powering any of a variety of accessories or implements. Drawbar 10 extends longitudinally from the rear axle housing 6, extending beyond the PTO housing 8.

Still referring to FIG. 1, system 5 is mounted to and supported by PTO output shaft 9. System 5 includes hydraulic pump 20 and pump support coupler 50. Hydraulic pump 20 is preferably a high displacement hydraulic pump. It can weigh between about 40 and about 70 pounds, optionally more than about 70 pounds, optionally have some other configuration(s). As conventional, hydraulic pump 20 includes a pump input shaft 22 (FIG. 2) and a pump housing 25 that can include a front wall with mounting bolts, screw bosses, and/or other mounting-type structures, for supporting the hydraulic pump 20 by way of the pump housing 25. This allows the pump housing 25 to be secured to a pump support coupler 50, using corresponding hardware.

In some implementations, the pump housing 25 does not attach directly to the pump support coupler 50, but rather they connect with each other by way of an intervening adapter plate 30. Adapter plate 30 is configured to convert the pump mounting bolt pattern to a bolt pattern provided on the coupler housing. This can be done with an adapter plate 30 that has a first set of e.g., posts, bolts, threaded bores, or other mounting structures with a pattern that corresponds to a bolt pattern on the hydraulic pump 20 and a second set of, e.g., posts, bolts, threaded bores, or other mounting structures with a pattern that corresponds to a bolt pattern on the pump support coupler 50. Such configuration allows the hydraulic pump 20 to connect to the adapter plate 30 and then the adapter plate 30 to connect to the pump support coupler 50, such that the adapter plate 30 is sandwiched therebetween.

Still referring to FIG. 1, pump support coupler 50 is configured to (i) bear and support the entire weight or load of pump 20, (ii) reduce or eliminate load-bearing stresses and bending-type loads to the pump input shaft 22, and (iii) provide a slip-fit type connection between itself and PTO output shaft 9, whereby the PTO output shaft 9 supports the entire or nearly entire weight or load of the pump 20 and pump support coupler 50 assemblage.

Figure 2:
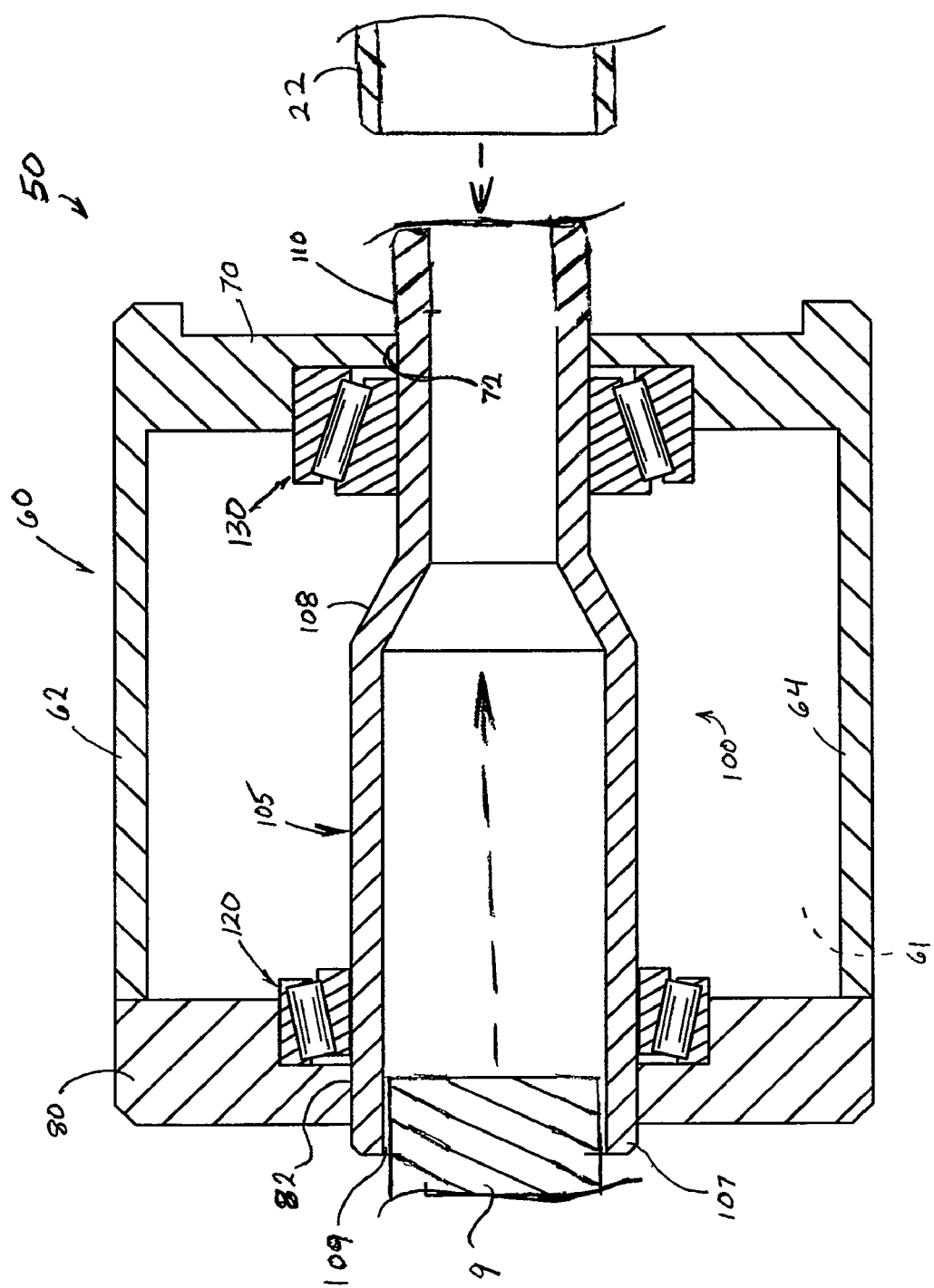
FIG. 2 illustrates a cross-sectional view of a pump support coupler, having a PTO shaft inserted into an end of a coupler shaft, taken at line 2-2 of FIG. 1.
Figure 3:
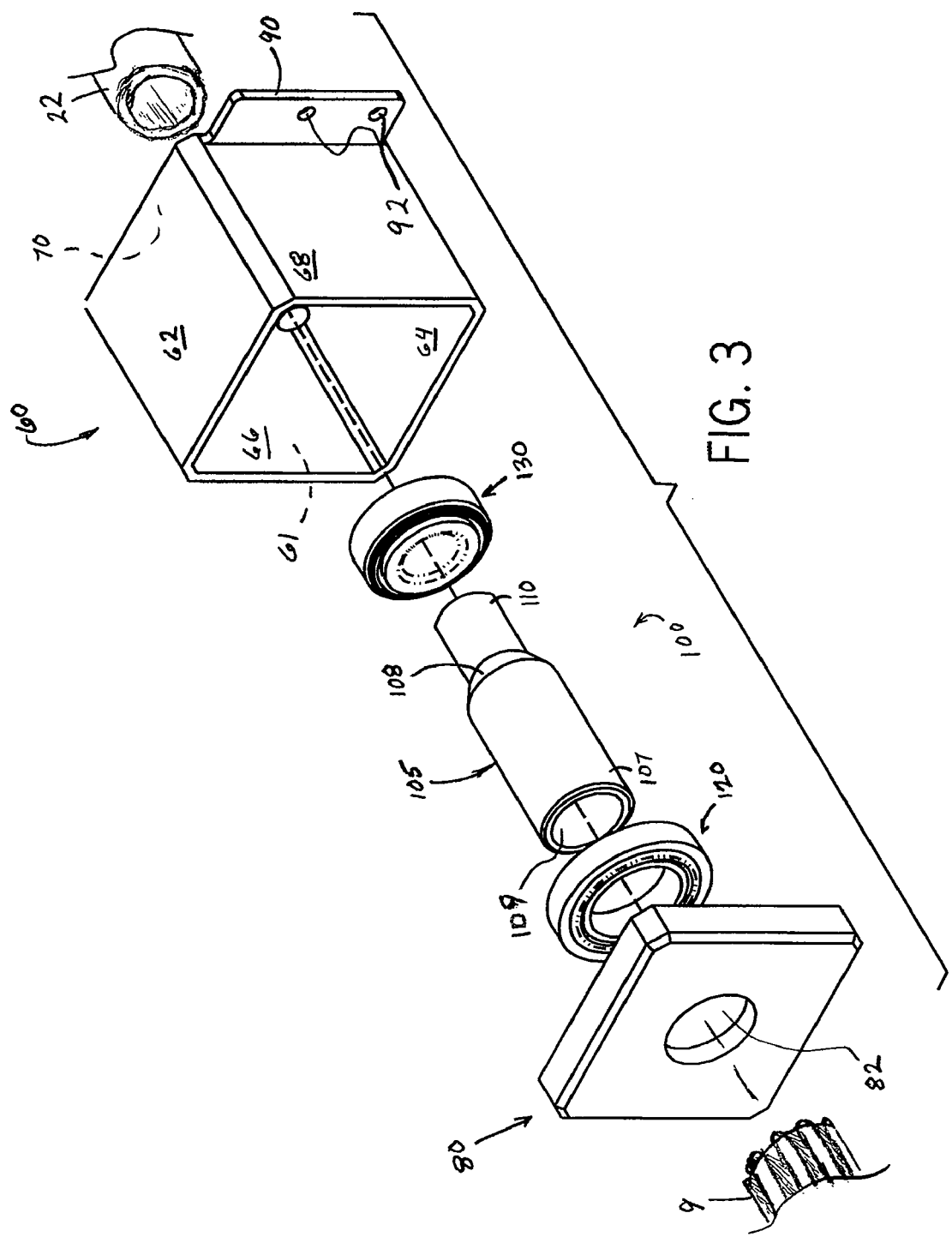
FIG. 3 illustrates an exploded view of the pump support coupler of FIG. 1.

Referring now to FIGS. 1-3, pump support coupler 50 includes a coupler housing 60, and a shaft assembly 100. The coupler housing 60 and shaft assembly 100 are configured to cooperate with the pump 20, so that the pump 20 and pump support coupler 50 can function as a unit that can be relatively easily and quickly installed, couple, fitted, or mounted to the tractor PTO output shaft 9. Coupler housing 60 encloses or houses the shaft assembly 100, and can include a top wall 62, a bottom wall 64, first and second opposing sidewalls 66 and 68, a back wall 70, and a front wall 80.

Referring now to FIG. 3, top and bottom walls 62, 64, and the sidewalls 66, 68 can be integral with each other, defining a tube-like configuration that defines a void space 61 (FIG. 3) therein. As seen best in FIG. 3, void space 61 may have an outer perimeter that is surrounded by a generally square tubing-like configuration of the top and bottom walls 62, 64, and the sidewalls 66.

Still referring to FIG. 3, in some implementations, various components of the coupler housing 60 can be removably attached to each other. For example, front wall 80 and/or back wall 70, or other coupler housing 60 components, may be removable from the rest of the coupler housing 60. In this configuration, the interior of the pump support coupler 50 can be selectively accessed, for servicing or otherwise. Preferably, when coupler housing 60 is fully assembled, it is a generally sealed enclosure that has aligned openings extending through the back and front walls 70, 80, namely, throughbores 72 and 82 (FIG. 2) that extend through front wall 70 and back wall 80, respectively. Throughbores 72 and 82 permit access to portions of the shaft assembly 100, or allow the shaft assembly 100 to interact with various other components of the system 5. This is explained in greater detail elsewhere herein.

Referring now to FIGS. 1 and 3, system 5 can be provided with at least one rotation prevention feature, such as a torque restraint strap 95. Torque restraint strap 95 can assume a flexible configuration, such as a chain or durable strap, or it can be a rigid member, preferably made of a metallic material. The torque restraint strap 95 can be connected directly to one of the top and bottom walls 62, 64, sidewalls 66, 68, back or front walls 70, 80, or some auxiliary mounting structure on the coupler housing 60. An example of such auxiliary mounting structure is housing flange 90.

Still referring to FIGS. 1 and 3, housing flange 90 may extend outwardly from an outer surface of the coupler housing 60. As best seen in FIG. 3, housing flange 90 can be an elongate tab that extends vertically down the edge of sidewall 68 that is nearest pump 20 (FIG. 1). One or more throughbores 92 are provided in the housing flange 90, facilitating the attachment of restraint strap 95 to the coupler housing 60.

Referring again to FIG. 1, torque restraint strap 95 and housing flange 90 are configured to cooperate with each other in a manner that permits adjustability and thus multiple mounting options for the system 5. For example, an upper portion of torque restraint strap 95 can have one or more elongate slots 97 that can align with throughbores 92 (FIG. 2) of housing flange 90. In this configuration, hardware that extends through the slots 97 and into or through 92 can be loosened, permitting vertical or other adjustability of the torque restraint strap 95 with respect to housing flange 90, and then retightened to temporarily fix the torque restraint strap 95 in place. Multiple bores 98 can extend through a lower portion of the torque restraint strap 95, providing multiple mounting options for attaching the lower end of torque restraint strap 95 to a generally fixed part of the tractor, such as drawbar 10.

The adjustability provided by slots 97 and bores 98 allow the torque restraint strap 95 to be utilized on multiple tractors by altering which of the bores 98 and which portion(s) of the slots 97 are implemented, depending on the particular configurations of differing tractors. This multiple tractor use or retrofit ability provided by the adjustment accommodating features of housing flange 90 and torque restraint strap 95 is further enhanced by the, e.g., slip fitting or PTO output shaft 9 mounting ability provided by the shaft assembly 100.

Referring now to FIGS. 2 and 3, shaft assembly 100 is configured to interface with the PTO output shaft 9, defining a load bearing coupling interface that supports the weight or load of both the pump 20 and pump support coupler 50 to which the pump 20 is attached. In this configuration, any shaft bending-type loads that might result from hanging a component, in a load bearing capacity, from the PTO output shaft 9, are realized at the shaft assembly 100. Due to this configuration of the shaft assembly 100, and also because the pump housing 25 is connected to the coupler housing 60 in a manner that mitigates any pump weight load bearing requirements of the pump input shaft 22, no shaft bending-type loads are imparted to the pump input shaft 22. Instead, the pump input shaft 22 is only subjected to torsional loads transmitted through the shaft assembly 100 which is driven by the PTO output shaft 9.

Still referring to FIGS. 2 and 3, shaft assembly 100 includes a coupler shaft 105, and first and second bearing assemblies 120 and 130. Coupler shaft 105 is an elongate cylindrical member with a relatively larger diameter first end 107, and a relatively smaller diameter second end 110. A frusto-conical tapering portion 108 extends between the first and second ends 107 and 110, defining a central or medial portion of the coupler shaft 105. Each of the first and second ends 107 and 110 is configured to interface and cooperate with a corresponding component of the tractor or system 5.

For example, still referring to FIGS. 2 and 3, first end 107 is configured to couple with the PTO output shaft 9. Typically, first end 107 includes a blind bore, extending axially thereinto and which is internally splined, e.g., internally splined bore 109. This configuration of internally splined bore 109 accommodates a conventional externally splined segment of PTO output shaft 9. Preferably, internally splined bore 109 has a depth, in other words extends axially into first end 107 a distance, which corresponds to a length of the externally splined portion of PTO output shaft 9.

In some implementations, most or the entire length of the PTO output shaft 9 that extends beyond PTO housing 8 is received into the internally splined bore 109. Internally splined bore 109 can extend to or axially through the entire frusto-conical tapering portion 108, allowing the PTO output shaft 9 to extend substantially far into the coupler shaft 105 and thus substantially far into the coupler housing 60. The PTO output shaft may extend more than, e.g., one-half or two-thirds of the distance across or through the coupler shaft 105 and housing 60. This configuration provides a relatively large surface area for the interface between the PTO output shaft 9 and the coupler shaft 105. Thus, concentrations of cantilever-like effects and bending-type forces or loads on the interface between the PTO output shaft 9 and the coupler shaft 105 are reduced, when compared to versions in which relatively less of the PTO output shaft 9 extends into the internally splined bore 109.

Still referring to FIGS. 2 and 3, second end 110 is configured to couple with and drive the pump input shaft 22 of hydraulic pump 20. Accordingly, the dimensions and configuration of the second end 110 correspond to those of the pump input shaft 22. If the pump input shaft 22 has external splines, then the second end 110 of coupler shaft 105 includes an internally splined blind bore. However, it is noted that the bores extending into ends 107 and 110 need not be blind. Rather, in some implementations the coupler shaft 105 is hollow and a single continuous void or bore extends axially through its entirety. Furthermore, referring specifically again to second end 110, if the pump input shaft 22 has a bore with internal splines, then an outer surface of second end 110 has corresponding external splines. In some such implementations, the second end 110 extends outwardly from the back wall 70, is externally splined, and has substantially the same dimensions and characteristics as the PTO output shaft 9. In other words, second end 110 can be configured to drive an internally splined shaft that was originally designed to be driven by a conventional PTO output shaft 9.

Referring yet further to FIGS. 2 and 3, bearing assemblies 120 and 130 are configured to mitigate manifestations of shaft bending of the coupler shaft 105. It is noted that, e.g., the first end 107 of the coupler shaft 105 may be subjected to shaft bending influences, since the interface of the coupler shaft 105 and PTO output shaft 9 support all the weight of the combined the pump 20 and pump support coupler 50 assemblage. Namely, the interface of the coupler shaft 105 and PTO output shaft 9 support all the weight of the combined the pump 20 and pump support coupler 50 apart from a nominal amount of load bearing support that a rigid torque restraint strap 95 might contribute to the system 5. Regardless, the bearing assemblies 120 and 130 are preferably mounted to or adjacent the back and front walls 70, 80 of the coupler housing 60 in order to provide the desired structural integrity to the shaft assembly 100.

Seen best in the sectional view of FIG. 2, bearing assemblies 120, 130 can be tapered roller bearings, as illustrated, or other configurations such as ball bearings, or others, depending on the particular intended end use characteristics. Bearing assemblies 120 and 130 can be press fit into counterbores that extend into the inner surfaces of back and front walls 70, 80, into the throughbores 72 and 82, respectively. In other words, the throughbores 72 and 82 are counterbored from the inner surfaces of back and front walls 70, 80. This configuration provides a shoulder or seat against which outer bearing races of the bearing assemblies 120, 130 are installed. For implementations that include such a shoulder(s), preferably, back and front walls 70 and 80 are relatively thicker than the upper and lower walls 62, 64, or sidewalls 66, 68. This allows the shoulder to have sufficient wall dimensions to adequately support the bearing assemblies 120 and 130 in both axial and radial directions.

Referring again to FIGS. 2 and 3, inner races of bearing assemblies 120 and 130 are concentrically fit to the outer circumferential surfaces of first and second ends 107 and 110, respectively. Accordingly, the back and front walls 70 and 80, by way of bearing assemblies 120 and 130, may fully support the shaft assembly 100 as it extends longitudinally through the coupler housing 60.

In light of the above, to use system 5, a pump support coupler 50 is selected based on, e.g., the coupler shaft 105 configuration, to ensure that the first end 107 is compatible with the PTO output shaft 9 and the second end 110 is compatible with the particular pump input shaft 22 of hydraulic pump 20. The pump input shaft 22 is aligned with the second end 110 of coupler shaft 105, and they are coupled by sliding together so that their respective splined surfaces intermesh.

The pump housing 25 is attached to the coupler housing 60, directly or indirectly, for example, by way of an adapter plate 150 or otherwise. Regardless of the particular attaching technique used to join the pump and coupler housings 25 and 60, they are connected so that coupler housing 60 carries the weight of the hydraulic pump 20, whereby the pump input shaft 22 does not serve a device weight-bearing function. When the hydraulic pump 20 and pump support coupler 50 are connected to each other, they are installed as a unit onto the tractor PTO output shaft 9. Namely, the first end 107 of coupler shaft 105 is aligned with the PTO output shaft 9 and hydraulic pump 20 and pump support coupler 50 assemblage is slip-fitted onto the shaft 9 by sliding the internally splined bore 109 over the externally splined PTO output shaft 9. Torque restraint strap 95 is then attached to the coupler housing 60, for example, by attaching an upper end of it to the housing flange 90. A lower end of the torque restraint strap 95 is then attached to the tractor, for example, drawbar 10.

While the invention has been shown and described with respect to particular embodiments, it is understood that alternatives and modifications are possible and are contemplated as being within the scope of the present invention. A wide variety of tractors and hydraulic pumps can employ the pump support coupler 50 of the present invention Many changes and modifications could be made to the invention without departing from the spirit thereof. The scope of these changes will become apparent from the appended claims.

We claim:

1. A pump support coupler assembly, comprising:
   a coupler housing having a front wall and a back wall, and an outer surface;
   a shaft assembly extending between the coupler housing front and back walls and including a shaft transmitting torque between a tractor power take off device and a hydraulic pump;
   a housing flange extending outwardly from the coupler housing outer surface; and
   a torque restraint strap connectable to the housing flange and a tractor drawbar, the torque restraint strap preventing the coupler housing from rotating in unison with the shaft of the shaft assembly.

2. The pump support coupler assembly as in claim 1, wherein the coupler housing includes multiple sidewalls and the front wall is removably attached to the sidewalls.

3. The pump support coupler assembly as in claim 1, wherein an end of the shaft has an internally splined bore extending axially thereinto that accepts a splined tractor power take off output shaft therein.

4. The pump support coupler assembly as in claim 1, further comprising a hydraulic pump coupled to the back wall of the housing.

5. The pump support coupler assembly as in claim 1, wherein the torque restraint strap includes a plurality of mounting arrangements, facilitating mounting the pump support coupler assembly to multiple assemblies of (i) power take off devices, and (ii) drawbars having different distances between the respective power take off devices and drawbars.

6. The pump support coupler assembly as in claim 1, wherein the torque restraint strap extends transversely beyond the housing flange.

7. The pump support coupler assembly as in claim 1, wherein the front and back walls include corresponding throughbores, the throughbores being axially aligned with each other.

8. The pump support coupler assembly as in claim 7, wherein the shaft extends through the throughbores of the front and back walls of the coupler housing.

9. The pump support coupler assembly as in claim 8, further comprising bearing assemblies provided inside the coupler housing, the bearings assemblies supporting first and second ends of the shaft.

10. The pump support coupler assembly as in claim 9, wherein the bearing assemblies include tapered roller bearings.

11. A hydraulic pump system for use with an agricultural tractor, comprising:
    a hydraulic pump having a pump input shaft; and
    a pump support coupler assembly having:
       (i) a coupler housing connected to the hydraulic pump;
       (ii) a shaft extending through the housing; and
       (iii) a torque restraint strap extending between the coupler housing to a tractor drawbar,
    wherein the shaft is coupled to a tractor power take off output shaft such that the pump support coupler assembly and hydraulic pump are supported by a power take off output shaft of a tractor.

12. The hydraulic pump system as in claim 11, wherein the weight of the hydraulic pump is supported by the pump support coupler assembly so that the pump input shaft is free of bending-type loads.

13. The hydraulic pump system as in claim 12, wherein the hydraulic pump weighs between about 40 pounds and about 70 pounds.

14. The hydraulic pump system as in claim 12, wherein the pump weighs greater than about 70 pounds.

15. The hydraulic pump system as in claim 12, wherein the torque restraint strap is a generally rigid member.

16. The hydraulic pump system as in claim 12, wherein the hydraulic pump has a pump housing with a predetermined mounting bolt pattern and wherein the hydraulic pump system further comprises an adapter plate provided between the pump and the coupler housing, the adapter plate converting the pump mounting bolt pattern to a bolt pattern provided on the coupler housing.

17. A method of attaching a hydraulic pump to an agricultural tractor, the method comprising:
    mounting a high displacement hydraulic pump to a coupler housing of a pump support coupler assembly so that a shaft extending through the coupler housing couples with an input shaft of the hydraulic pump; and
    aligning a front wall of the coupler housing with a power take off output shaft of a tractor;
    coupling the shaft that extends through the coupler housing to the power take off output shaft so that the power take off output shaft fully supports the weight of the hydraulic pump and the pump support coupler assembly; and
    attaching a first end of a torque restraint strap to the coupler housing and a second end of a torque restraint strap to a generally fixed component of the tractor.

18. The method as in claim 17, wherein the generally fixed component of the tractor is a drawbar.

19. The method as in claim 17, wherein the power take off output shaft, the shaft that extends through the coupler housing, and the pump input shaft are aligned and registered with each other.

20. The method as in claim 17, wherein the front wall of the coupler housing is longitudinally spaced from a rear axle housing of the tractor.

* * * * *